United States Patent
Mikami et al.

(10) Patent No.: US 10,654,201 B2
(45) Date of Patent: May 19, 2020

(54) COMPOSITE RESIN MOLDED BODY, MANUFACTURING METHOD THEREOF, AND CASING MEMBER USING SAME

(71) Applicant: Panasonic Corporation, Osaka (JP)

(72) Inventors: Masateru Mikami, Osaka (JP); Masashi Hamabe, Osaka (JP); Takao Kuromiya, Osaka (JP)

(73) Assignee: Panasonic Corporation, Osaka (JP)

( * ) Notice: Subject to any disclaimer, the term of this patent is extended or adjusted under 35 U.S.C. 154(b) by 404 days.

(21) Appl. No.: 15/497,809

(22) Filed: Apr. 26, 2017

(65) Prior Publication Data

US 2017/0334105 A1    Nov. 23, 2017

(30) Foreign Application Priority Data

May 20, 2016 (JP) ................................ 2016-100956
Dec. 22, 2016 (JP) ................................ 2016-248537

(51) Int. Cl.
| | |
|---|---|
| B29B 7/00 | (2006.01) |
| B29C 43/00 | (2006.01) |
| B29B 9/14 | (2006.01) |
| C08L 1/02 | (2006.01) |
| C08J 5/18 | (2006.01) |
| C08L 23/10 | (2006.01) |
| B29B 7/90 | (2006.01) |
| B29B 11/16 | (2006.01) |
| B29C 55/00 | (2006.01) |
| B29C 55/12 | (2006.01) |
| B29B 9/06 | (2006.01) |

(Continued)

(52) U.S. Cl.
CPC .............. *B29C 43/003* (2013.01); *B29B 7/00* (2013.01); *B29B 7/90* (2013.01); *B29B 9/14* (2013.01); *B29B 11/16* (2013.01); *B29C 55/005* (2013.01); *B29C 55/12* (2013.01); *C08J 5/18* (2013.01); *C08L 1/02* (2013.01); *C08L 23/10* (2013.01); *B29B 7/483* (2013.01); *B29B 7/7495* (2013.01); *B29B 9/06* (2013.01); *B29B 9/16* (2013.01); *B29K 2023/12* (2013.01); *B29K 2105/16* (2013.01); *C08J 2323/12* (2013.01)

(58) Field of Classification Search
USPC ..... 428/402, 221, 323, 326, 411.1; 264/239, 264/241, 257
See application file for complete search history.

(56) References Cited

U.S. PATENT DOCUMENTS

| 6,395,342 B1 | 5/2002 | Kadowaki et al. |
| 8,012,573 B2 | 9/2011 | Kowata et al. |

(Continued)

FOREIGN PATENT DOCUMENTS

| JP | 2001-049012 | 2/2001 |
| JP | 2007-125739 | 5/2007 |

(Continued)

*Primary Examiner* — Matthew D Matzek
(74) *Attorney, Agent, or Firm* — Panasonic IP Management; Kerry S. Culpepper (57) ABSTRACT

A composite resin molded body includes a base compound resin and a molten-kneaded mixture which contains an organic fibrous filler, and a dispersing agent. In the composite resin molded body, a content of the organic fibrous filler is at least 5 mass % and at most 70 mass %, and a proportion T of the organic fibrous filler carbonized in the composite resin molded body is equal to or less than 0.1.

7 Claims, 2 Drawing Sheets

(51) Int. Cl.
 *B29B 7/74* (2006.01)
 *B29B 7/48* (2006.01)
 *B29B 9/16* (2006.01)
 *B29K 23/00* (2006.01)
 *B29K 105/16* (2006.01)

(56) References Cited

U.S. PATENT DOCUMENTS

| | | | |
|---|---|---|---|
| 2002/0192401 A1 * | 12/2002 | Matsumoto | B29C 48/40 |
| | | | 428/15 |
| 2010/0173146 A1 | 7/2010 | Ihara et al. | |
| 2010/0272980 A1 | 10/2010 | Kowata et al. | |
| 2011/0274908 A1 | 11/2011 | Kowata et al. | |
| 2014/0336309 A1 | 11/2014 | Sakata et al. | |
| 2014/0343196 A1 | 11/2014 | Kousaka et al. | |

FOREIGN PATENT DOCUMENTS

| | | | |
|---|---|---|---|
| JP | 2008-013599 A | | 1/2008 |
| JP | 2010-221622 | | 10/2010 |
| JP | 2011231237 A | * | 11/2011 |
| JP | 2012-102324 | | 5/2012 |
| JP | 2013-091775 A | | 5/2013 |
| WO | 2009/081881 | | 7/2009 |
| WO | 2013/099530 A1 | | 7/2013 |

\* cited by examiner

COMPOSITE RESIN MOLDED BODY, MANUFACTURING METHOD THEREOF, AND CASING MEMBER USING SAME

BACKGROUND

1. Technical Field

The disclosure relates to a composite resin molded body in which an organic fibrous filler is dispersed well, a manufacturing method thereof, and a casing member using the composite resin molded body.

2. Description of the Related Art

A general-purpose resin is used well as a material of various household items, for example, bags, various packages, various containers, and sheets, and as a material of an industrial component such as a vehicle component and an electrical component, daily commodities, and miscellaneous goods. However, a molded body of the general-purpose resin has a defect of, for example, insufficient mechanical strength. Thus, a composite resin molded body in which natural fiber, glass fiber, carbon fiber, and the like which are fibrous fillers are dispersed as reinforcing fiber, in a general-purpose resin, and thus mechanical strength of the general-purpose resin is improved is used for reinforcing the general-purpose resin. Among the fillers, an organic fibrous filler of cellulose and the like is inexpensive and excellent in environmental properties at a time of discarding. Thus, the organic fibrous filler receives attention as reinforcing fiber.

The composite resin molded body has a problem in that it is difficult to disperse an organic fibrous filler in a molten resin or a problem in that the color of an organic fibrous filler is changed in a dispersing process, and thus a composite resin molded body has a changed color (the color changing is also referred to as "color deepening" below). If color deepening occurs, an appearance of a composite resin molded body as a casing member of home appliances and the like is deteriorated. Thus, there is a problem in that an expansion destination of the composite resin molded body is limited. Thus, when a resin pellet in which a resin and fiber are mixed is manufactured, in Japanese Patent Unexamined Publication No. 2012-102324, a fibrous filler is dispersed in a resin in a manner that fiber in pulp is defibrated and dried by a wet construction method, and then a molten resin is mixed with the fiber obtained by defibration, and a specific dispersing agent is blended. In Japanese Patent Unexamined Publication No. 2007-125739, when a fibrous filler is mixed in a molten resin, the fibrous filler is impregnated for a short period, and thus color deepening of a composite resin is suppressed.

SUMMARY

According to the disclosure, there is provided a composite resin molded body which includes a base compound resin and a molten-kneaded mixture which contains an organic fibrous filler and a dispersing agent. The organic fibrous filler is a cellulose compound in which cellulose is contained, and has a content of at least 5 mass % and at most 70 mass % in the composite resin molded body. A proportion T of the organic fibrous filler carbonized in the composite resin molded body is represented by Formula (1) when $P_C$ is set as a height of a peak derived from a carbonyl group in an IR spectrum obtained by analyzing any place of the composite resin molded body with a FT-IR method, and $P_{UC}$ is set as a height of a peak derived from an ether group in the same IR spectrum, and the proportion T is equal to or less than 0.1.

$$T = P_C/(P_C + P_{UC}) \qquad (1)$$

According to the disclosure, dispersing of the organic fibrous filler is improved and color deepening is suppressed, and thus it is possible to realize a pellet of a composite resin molded body which has excellent mechanical strength and excellent appearance. In a molded medium obtained by molding a pellet of the composite resin molded body according to the disclosure as a material, color deepening does not occur. Thus, it is possible to provide a casing member which is useful as a casing member in a wide field of home appliances and the like and has excellent characteristics.

DETAILED DESCRIPTION

Before an exemplary embodiment is described, a problem in the related art will be briefly described.

In Japanese Patent Unexamined Publication No. 2012-102324, a fibrous filler defibrated by a wet construction method may be broken at the same time of defibration, and a fiber length is reduced. Thus, thermal conductivity may be degraded. However, when a resin pellet is manufactured or when a resin pellet is subjected to injection molding, a fibrous filler which has degraded thermal conductivity may be easily deteriorated by heat and color deepening may occur. That is, color deepening may occur in a product obtained by injection molding. As described above, in a composite resin molded body in which an organic fibrous filler is dispersed in a resin, it is difficult to suppress an occurrence of color deepening.

In Japanese Patent Unexamined Publication No. 2007-125739, it is possible to suppress the occurrence of color deepening of a composite resin molded body. However, since a fibrous filler in a resin pellet remains as an aggregate without being dispersed, fluidity of the resin pellet at a time of molding may be degraded, and appearance poorness may occur in the obtained composite resin molded body.

Considering two problems of the related art, which are the occurrence of color deepening of a molded body and dispersing of an organic fibrous filler which have a trade-off relationship, an object of the disclosure is to provide a composite resin molded body which can simultaneously solve suppressing of the occurrence of color deepening of the organic fibrous filler and improvement of dispersibility.

Hereinafter, the exemplary embodiment will be described.

A composite resin molded body according to the exemplary embodiment includes a base compound resin and a molten-kneaded mixture which contains an organic fibrous filler and a dispersing agent. A composite resin pellet, a molded body molded from a composite resin pellet, and an exterior member or an interior member of a product, which is manufactured by using the molded body correspond to the composite resin molded body. The organic fibrous filler carbonized in the composite resin molded body has a specific proportion.

Figure 1:
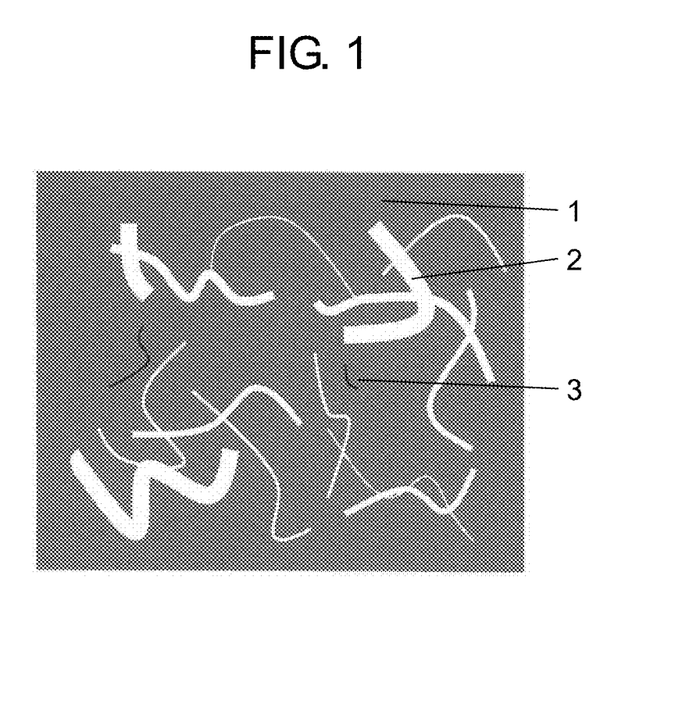
FIG. 1 is a schematic diagram illustrating a section of a composite resin molded body according to an exemplary embodiment.

FIG. 1 is a schematic diagram illustrating a section of the composite resin molded body according to the exemplary embodiment. As illustrated in the schematic diagram of FIG. 1, in the composite resin molded body, organic fibrous filler 2 is dispersed in base compound resin 1, and a portion of organic fibrous filler 2 is provided in a form of carbonized organic fibrous filler 3.

In the exemplary embodiment, it is preferable that base compound resin 1 is a thermoplastic resin, in order to ensure good formability. Examples of the thermoplastic resin include an olefinic resin (including a cyclic olefinic resin), a styrene resin, a (meth)acrylic resin, an organic acid vinyl ester resin or derivatives thereof, a vinyl ether type resin, a halogen containing resin, a polycarbonate resin, a polyester resin, a polyamide resin, a thermoplastic polyurethane resin, a polysulfone resin (polyethersulfone, polysulfone, and the like), a polyphenylene ether resin (polymer of 2,6-xylenol and the like), cellulose derivatives (cellulose esters, cellulose carbamates, cellulose ethers, and the like), a silicone resin (polydimethylsiloxane, polymethylphenylsiloxane, and the like), rubber or elastomer (diene rubber such as polybutacliene and polyisoprene, styrene-butadiene copolymer, acrylonitrile-butadiene copolymer, acrylic rubber, urethane rubber, silicone rubber, and the like). The above resin may be singly used or may be used in combination of two types or more thereof.

Base compound resin 1 is not limited to the above materials as long as base compound resin 1 has thermoplasticity.

Among the above thermoplastic resins, it is preferable that base compound resin 1 is an olefinic resin having a relatively low melting point. As the olefinic resin, copolymer of olefinic monomer, and copolymer of olefinic monomer and other copolymerizable monomer are included in addition to homopolymer of olefinic monomer.

Examples of olefinic monomer include chain olefins (α-C2-20 olefin such as ethylene, propylene, 1-butene, isobutene, 1-pentene, 4-methyl-1-pentene, 1-octene, and the like), and cyclic olefins. The above olefinic monomer may be singly used or may be used in combination of two types or more thereof. Among the above olefinic monomers, chain olefins such as ethylene and propylene are preferable.

Examples of other copolymerizable monomer include fatty acid vinyl ester such as vinyl acetate and vinyl propionate; (meth)acrylic monomer such as (meth)acrylic acid, alkyl (meth)acrylate, and glycidyl (meth)acrylate; unsaturated dicarboxylic acid or an anhydride thereof such as maleic acid, fumaric acid, and maleic anhydride; vinyl ester of carboxylic acid (for example, vinyl acetate, vinyl propionate, and the like) and the like; cyclic olefin such as norbornene and cyclopentadiene; and dienes such as butadiene and isoprene. The above copolymerizable monomer may be singly used or may be used in combination of two types or more thereof.

Specific examples of the olefinic resin include copolymer of chain olefins (particularly, α-C2-4 olefin) such as polyethylene (polyethylene and the like of low density, middle density, high density, or linearly low density), polypropylene, ethylene-propylene copolymer, and a terpolymer such as ethylene-propylene-butene-1.

Next, the dispersing agent will be described.

The composite resin molded body according to the exemplary embodiment contains a dispersing agent, for example, in order to improve adhesiveness between organic fibrous filler 2 and base compound resin 1, or to improve dispersibility of organic fibrous filler 2 in base compound resin 1. Examples of the dispersing agent include a variety of titanate coupling agents and silane coupling agents, unsaturated carboxylic acid, maleic acid, maleic anhydride, modified polyolefin obtained by grafting anhydrides thereof, fatty acid, fatty acid metal salt, and fatty acid ester. As the silane coupling agent, a silane coupling agent of unsaturated hydrocarbon series or epoxy series is preferable. The surface of the dispersing agent has no problem even when the surface is subjected to modification treatment in which treatment is performed with a thermosetting or thermoplastic polymer component.

In the composite resin molded body according to the exemplary embodiment, the content of the dispersing agent is preferably at least 0.01 mass % and at most 20 mass %, more preferably at least 0.1 mass % and at most 10 mass %, and further preferably at least 0.5 mass % and at most 5 mass %. If the content of the dispersing agent is less than 0.01 mass %, dispersing poorness occurs. If the content of the dispersing agent is more than 20 mass %, strength of the composite resin molded body is degraded.

Next, organic fibrous filler 2 will be described.

The composite resin molded body according to the exemplary embodiment contains organic fibrous filler 2, in order to improve mechanical characteristics or to obtain effects of, for example, dimension stability and the like by reducing the linear expansion coefficient.

In organic fibrous filler 2, thermal conductivity is uniformly imparted up to the inside of the molded body, and thus it is suppressed that heat energy is locally generated by shearing force when the resin is molten and kneaded. In addition, in order to suppress the occurrence of color deepening by carbonizing the organic fibrous filler, it is preferable that organic fibrous filler 2 has thermal conductivity higher than that of base compound resin 1. Specifically, a fibrous filler such as pulp, cellulose, cellulose nanofiber, lignocellulose, lignocellulose nanofiber, cotton, silk, wool, and hemp, jute fiber, recycled fiber such as rayon or cupra, and semi-synthetic fiber such as acetate and promix, synthetic fiber of polyester, polyacrylonitrile, polyamide, aramid, and polyolefin, and modified fiber obtained by chemically modifying the surface and the terminal of the above matters. Among the above matters, from a viewpoint of availability, high thermal conductivity, and a low linear expansion coefficient, celluloses in which cellulose is contained as a composition, for example, pulp, cellulose, cellulose nanofiber, lignocellulose, lignocellulose nanofiber, cotton, hemp, jute fiber, rayon, cupra, or acetate are particularly preferable. Fibrous fillers formed of the above matters may be mixed.

A portion of organic fibrous filler 2 may have a three-dimensional structure in which it is difficult to move heat energy to base compound resin 1 or organic fibrous filler 2, because a fiber diameter is small, a fiber length is small, or the degree of entanglement between strands of fiber is small. In addition, the temperature of organic fibrous filler 2 is locally increased. Thus, a carbonization reaction may proceed and color deepening may slightly occur at the portion of organic fibrous filler 2. FIG. 1 illustrates carbonized organic fibrous filler 3.

In a plurality of organic fibrous fillers which appears in a section of the composite resin molded body according to the exemplary embodiment, a proportion (carbonization degree)

T of organic fibrous fillers which are carbonized and dispersed in the composite resin molded body is obtained by measurement using an optical analysis method such as a Raman spectroscopy or a Fourier transform infrared spectroscopy (FT-IR) method. For example, in a case where the organic fibrous filler is celluloses, the carbonization degree T is obtained in a manner that calculation of the following Formula (1) is performed by using the height $P_C$ of a peak derived from a carbonyl group in an IR spectrum and a height $P_{UC}$ of a peak derived from an ether group in the IR spectrum. The IR spectrum is obtained by analyzing any place of the composite resin molded body with a FT-IR method.

$$T=P_C/(P_C+P_{UC}) \quad (1)$$

The cellulose is decomposed by proceeding of a carbonization reaction. Thus, the number of ether groups (C—O—C) constituting cellulose is decreased, and the height of a peak $P_{UC}$ (in the vicinity of a wavelength of 1060 cm-1) derived from an ether group in the IR spectrum is reduced. While the carbonization reaction of cellulose proceeds, the number of carbonyl groups is increased. Thus, a height $P_C$ of a peak derived from the carbonyl group in the IR spectrum is increased. Thus, the carbonization degree T of celluloses can be calculated by the Formula (1).

In addition, the proportion ($S_C/(S_C+S_{UC})$) of the carbonized organic fibrous filler can be also calculated as the carbonization degree T, by using the summation $S_C$ of areas of the carbonized organic fibrous fillers and the summation $S_{UC}$ of areas of organic fibrous fillers which are not carbonized.

In the above analysis method, it is preferable that a viewing angle is a range of about 200 μm in every direction. However, it is not limited to the above measurement means and the viewing angle, macroscopically, if the proportion T of organic fibrous filler which are carbonized and dispersed in the composite resin molded body can be measured.

As the proportion T of the organic fibrous filler becomes closer to 1, the carbonization reaction proceeds more, and the degree of color deepening of the composite resin molded body is increased. As the proportion T of the organic fibrous filler becomes closer to 0, the carbonization reaction hardly proceeds, and color deepening of the composite resin molded body does not occur.

In the exemplary embodiment, it is necessary that the proportion T of the carbonized organic fibrous filler is equal to or less than 0.1. The proportion T of the carbonized organic fibrous filler is preferably equal to or less than 0.08, and more preferably equal to or less than 0.06. If the proportion T of the carbonized organic fibrous filler is more than 0.1, the temperature of the organic fibrous filler is locally increased, and thus the organic fibrous filler is carbonized. Accordingly, color deepening occurs in a resin pellet. The color of the resin pellet subjected to color deepening is visually recognized easier than white (being transparent). Thus, there is a problem that an industrial expansion destination in a case of being used in a raw material of injection molding as a white pellet is limited. If the proportion T of the carbonized organic fibrous filler is equal to or less than 0.1, carbonization of the organic fibrous filler hardly proceeds. Thus, it is possible to suppress the occurrence of color deepening of the composite resin molded body, and to obtain a composite resin molded body for being used in a raw material of injection molding as a white pellet.

Figure 2:
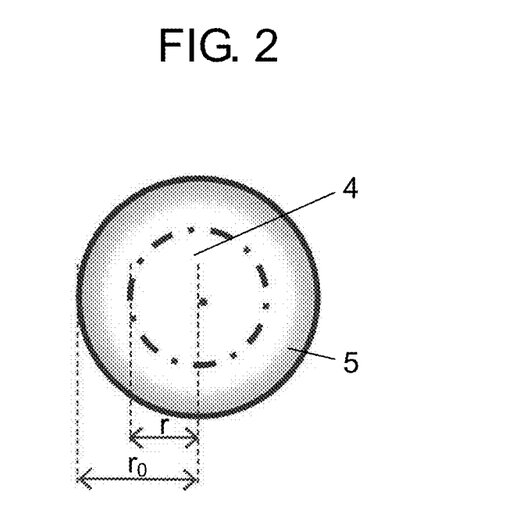
FIG. 2 is a schematic diagram illustrating a section of an organic fibrous filler dispersed in the composite resin molded body according to the exemplary embodiment.

FIG. 2 illustrates a schematic diagram illustrating a section of the organic fibrous filler dispersed in the composite resin molded body according to the exemplary embodiment. When a radius of an organic fibrous filler which has a diameter of about 5 μm and is provided in base compound resin 1 is set as $r_0$, and a distance from the center of the section is set as r, in the section of the organic fibrous filler, a portion at which the distance r from the center of the section is equal to or more than √2/2 times the radius $r_0$ is defined as a periphery of the section. In the section of the organic fibrous filler, a portion at which the distance r from the center of the section is less than √2/2 times the radius $r_0$ is defined as a center of the section.

A proportion $T_{OUT}$ of the carbonized periphery is represented by Formula (2), and a proportion $T_{IN}$ of the carbonized center is represented by Formula (3). It is preferable that the proportion $T_{OUT}$ and the proportion $T_{IN}$ satisfy the following Formula (4).

$$T_{OUT}=S_{OUT-C}/(S_{OUT-C}+S_{OUT-UC}) \quad (2)$$

$$T_{IN}=S_{IN-C}/(S_{IN-C}+S_{IN-UC}) \quad (3)$$

$$T_{IN}<T_{OUT} \quad (4)$$

(regarding sections of a plurality of organic fibrous fillers shown in the section of a composite resin molded body, $S_{OUT-C}$ indicates the total area of carbonized peripheries, $S_{OUT-UC}$ indicates the total area of peripheries which are not carbonized, $S_{IN-C}$ indicates the total area of carbonized centers, and $S_{IN-UC}$ indicates the total area of the centers which are not carbonized).

The reason will be described below.

That is, in a case where $T_{OUT}$ is more than $T_{IN}$, carbonization in the surface of an organic fibrous filler proceeds, but carbonization of the center thereof does not proceed. Thus, it is possible to ensure mechanical strength. In a case where $T_{OUT}$ is smaller than $T_{IN}$, carbonization at the center of an organic fibrous filler proceeds. Thus, a problem of degrading mechanical strength of the organic fibrous filler itself occurs. Thus, in the section of the organic fibrous filler, it is preferable that the proportion of the carbonized periphery is more than the proportion of the carbonized center.

In organic fibrous filler 2 dispersed in base compound resin 1, a fiber diameter of $D_{10}$ (fiber diameter corresponding to an accumulation ratio of 10% in a distribution curve of fiber diameter distribution) in the fiber diameter distribution is preferably equal to or less than 500 nm, and a fiber diameter of $D_{90}$ (fiber diameter corresponding to an accumulation ratio of 90% in a distribution curve of fiber diameter distribution) in the fiber diameter distribution is preferably equal to or more than 5 μm. The reason will be described below.

That is, in order to improve mechanical strength of base compound resin 1, it is preferable that organic fibrous filler 2 is dispersed in a state where the fiber diameter is small. If the fiber diameter of $D_{10}$ is equal to or less than 500 nm, it is possible to increase the number of pieces of organic fibrous filler 2 dispersed in base compound resin 1, and to improve mechanical strength of the composite resin molded body. If the fiber diameter of $D_{10}$ is more than 500 nm, the number of pieces of organic fibrous filler 2 dispersed in base compound resin 1 is decreased. Thus, a problem of degrading mechanical strength of a composite resin molded body occurs.

Organic fibrous filler 2 having a fiber diameter of $D_{90}$ which is equal to or more than 5 μm can ensure thermal conductivity in base compound resin 1. Thus, it is possible to suppress carbonization of organic fibrous filler 2. In organic fibrous filler 2 having a fiber diameter of $D_{90}$ which is smaller than 5 µm, thermal conductivity is degraded when heat is locally generated in base compound resin 1. Thus, there is a problem in that carbonization of organic fibrous filler 2 is caused. Thus, regarding an organic fibrous filler, it is preferable that the fiber diameter of $D_{10}$ is equal to or less than 500 nm and the fiber diameter of $D_{90}$ is equal or more than 5 µm.

In the composite resin molded body according to the exemplary embodiment, the content of the organic fibrous filler is necessarily at least 5 mass % and at most 70 mass %. The content of the organic fibrous filler is preferably 7.5 mass % to 60 mass %, and more preferably 10 mass % to 50 mass %. If the content of the organic fibrous filler is less than 5 mass %, it is not possible that a composite resin molded body ensures mechanical strength. If the content of the organic fibrous filler is more than 70 mass %, viscosity at a time of molten-kneading is increased. Thus, dispersibility of an organic fibrous filler in the base compound resin is degraded, and thus there is a problem that, for example, appearance poorness occurs in the obtained composite resin molded body.

The composite resin molded body according to the exemplary embodiment contains the organic fibrous filler as a fibrous filler. However, in order to suppress the occurrence of color deepening by carbonizing the organic fibrous filler, the composite resin molded body may contain a fibrous filler other than the organic fibrous filler, which can uniformly impart thermal conductivity up to the inside of the molded body. Examples of the fibrous filler other than the organic fibrous filler include carbon fiber, carbon nanotube, basic magnesium sulfate fiber (magnesium oxysulfate fiber), potassium titanate fiber, aluminum borate fiber, calcium silicate fiber, calcium carbonate fiber, glass fiber, silicon carbide fiber, wollastonite, xonotlite, and various metal fiber. Among the above types of fiber, carbon fiber, carbon nanotube, and glass fiber are preferable.

Carbonization of an organic fibrous filler dispersed in base compound resin 1 is controlled, and thus it is possible to adjust brightness (L value) of the composite resin molded body. The brightness (L value) is a value indicated by L value in a Lab color system. As the brightness (L value) becomes higher, the color is a decolored color. As the L value becomes smaller, the color is a deep color. The brightness (L value) can be measured by a meter such as a color difference meter. In the exemplary embodiment, the brightness (L value) is measured in accordance with the following method. That is, a color difference meter was abutted on a composite resin molded body manufactured by molten-kneading base compound resin 1, an organic fibrous filler, and a dispersing agent. Then, brightness (L value) was measured. When brightness of base compound resin 1 is set as $(L^*)1$ and brightness of a composite resin molded body configured by base compound resin 1, the organic fibrous filler, and the dispersing agent in the above measurement method is set as $(L^*)2$, an absolute value $\Delta L$ (described as a color difference below) of a difference between $(L^*)1$ and $(L^*)2$ is preferably equal to or less than 10. If the color difference is in the range, the color of the composite resin molded body is hardly changed in comparison to the color of base compound resin 1. Thus, the composite resin molded body can be used in various members. In a case where the color difference is more than 10, color deepening of the composite resin molded body occurs. Thus, there is a problem that an industrial expansion destination of the composite resin molded body is limited.

Next, a manufacturing method of the composite resin molded body will be described with reference to FIG. 3.

Figure 3:
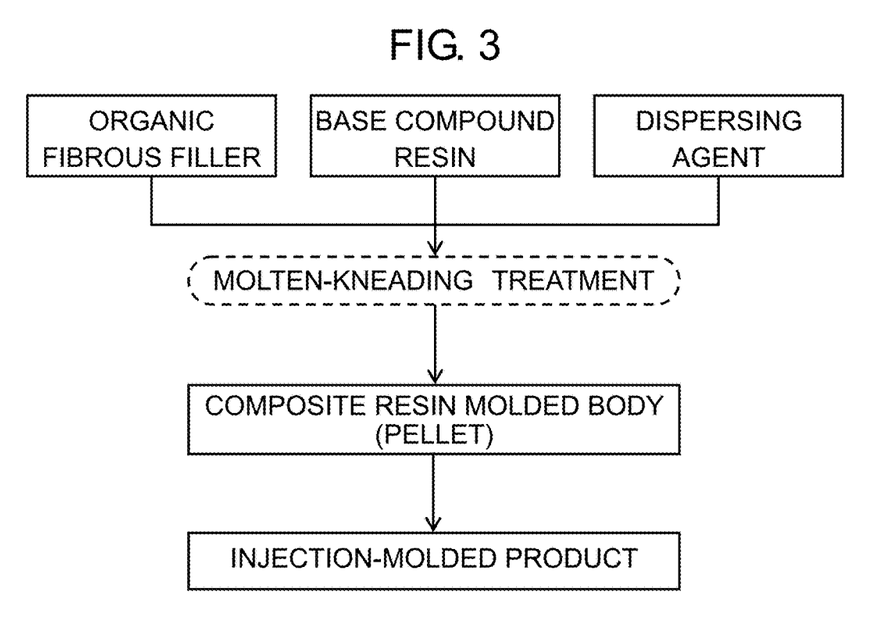
FIG. 3 is a flowchart illustrating a manufacturing process of the composite resin molded body according to the exemplary embodiment.

FIG. 3 is a flowchart illustrating a manufacturing process of the composite resin molded body according to the exemplary embodiment.

A base compound resin, an organic fibrous filler, and a dispersing agent are put into a molten-kneading treatment device, and molten-kneading is performed in the device. Thus, the base compound resin is molten, and the organic fibrous filler and the dispersing agent are dispersed in the molten base compound resin. Simultaneously, defibration of an aggregate of the organic fibrous filler is accelerated by a shearing action of the device. Thus, the organic fibrous filler can be further finely dispersed in the base compound resin.

In the related art, a medium in which fiber is defibrated in advance by pretreatment such as wet dispersing is used as the organic fibrous filler. However, since the organic fibrous filler is damaged by the pretreatment, the fiber length may be reduced, and defects may partially occur in fiber. Thus, in a molten resin containing an organic fibrous filler which has been subjected to pretreatment such as wet dispersing, thermal conductivity by the organic fibrous filler is degraded. Thus, the heated organic fibrous filler has a temperature which is locally higher than a thermal decomposition temperature thereof, and thus carbonization occurs and the obtained composite resin molded body is subjected to color deepening.

On the contrary, in the manufacturing process of the composite resin molded body according to the exemplary embodiment, the base compound resin, the dispersing agent, and the like are integrally subjected to molten-kneading treatment, without performing pretreatment by wet dispersing for the purpose of defibration treatment and modification treatment of the organic fibrous filler (total dry construction method). In this construction method, wet dispersing treatment of the organic fibrous filler is not performed, and thus damage to the organic fibrous filler is reduced, and a situation in which an organic fibrous filler having a large fiber diameter is provided in a molten resin, and thus thermal conductivity is degraded occurs less frequently. Thus, an increase of the temperature of the molten resin is easily suppressed. Accordingly, since it is difficult to cause carbonization of the organic fibrous filler to proceed, it is possible to suppress the occurrence of color deepening of a composite resin molded body pellet.

Figure 4:
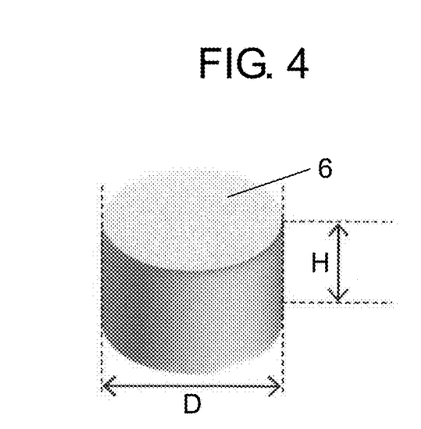
FIG. 4 is a representative schematic diagram illustrating a composite resin molded body pellet according to the exemplary embodiment.

A molten composite resin extruded from the molten-kneading device is subjected to a cooling process of, for example, a water cooling device, and then is manufactured in a form of a pellet, through a cutting process of a pelletizer and the like. FIG. 4 illustrates a representative schematic diagram of composite resin molded body pellet 6 manufactured by the manufacturing method according to the exemplary embodiment. Regarding dimensions of cylindrical composite resin molded body pellet 6, from a viewpoint of input properties and fluidity of a resin pellet material in an injection molding machine, a height H is preferably 1 to 10 mm and more preferably 2 to 5 mm. With the similar reason, an outer diameter D is preferably equal to or less than 10 mm, and more preferably 2 to 5 mm. The shape of composite resin molded body pellet 6 is not limited to the cylindrical shape. A resin pellet having a curved shape or a spherical shape may be provided.

The composite resin molded body pellet is subjected to injection molding, and thus it is possible to manufacture an injection-molded product as the composite resin molded body. As described above, in the composite resin molded body pellet, damage to the organic fibrous filler is reduced, a situation in which an organic fibrous filler having a large fiber diameter is provided and thermal conductivity when an injection-molded product is manufactured is degraded occurs less frequently. Thus, it is possible to obtain an injection-molded product in which the occurrence of color deepening is suppressed. In the composite resin molded body pellet, a fibrous filler having a small fiber diameter is also dispersed. Thus, the obtained injection-molded product also has mechanical strength.

EXAMPLES

Examples and comparative examples will be described below.

The characteristics of the composite resin molded body and the organic fibrous filler were measured and evaluated by the following methods.

(1) Fiber Diameter

Sectional SEM measurement was performed on an obtained sheet. Then, fiber diameter distribution of pulp dispersed in polypropylene was calculated, and thus a fiber diameter of $D_{90}$ and a fiber diameter of $D_{10}$ in fiber diameter distribution were obtained.

(2) Elastic Modulus and Mechanical Strength

The obtained pulp-dispersed polypropylene sheet was subjected to die-punching so as to have a dumbbell shape, and elastic modulus was measured by a tensile test device. As evaluation of mechanical strength, a sheet having elastic modulus of 2.0 GPa or larger was determined to be good, and evaluated as "A". A sheet having elastic modulus of 2.0 GPa or less was evaluated as "B".

(3) Proportion T of Carbonized Organic Fibrous Filler

Evaluation of a carbonization degree of the carbonized organic fibrous filler will be described. Evaluation was performed by using the Fourier transform infrared spectroscopy (FT-IR) method (iS10 manufactured by Thermo Fisher Scientific Corporation). With the above-described Formula (1), the carbonization degree T of any place of the molded body was measured.

(4) Color Difference ($\Delta L$)

Regarding the obtained sheet, the L value (brightness) was measured and a color difference was calculated, by using a color difference meter. Firstly, a color difference meter (CM-700d manufactured by KONICA MINOLTA, INC.) was installed on the surface of a sheet, and brightness ($(L^*)2$) was measured. An absolute value of a difference from brightness ($(L^*)1$) of a sheet of polypropylene which was the base compound resin was calculated, and thus a color difference ($\Delta L$) was obtained. Regarding evaluation of suppression of the occurrence of color deepening, a sheet in which the color difference ($\Delta L$) was equal to or less than 10 was determined to be good and evaluated as "A". A sheet in which the color difference ($\Delta L$) is more than 10 was evaluated as "B".

(5) Appearance

Regarding the obtained sheet, appearance was observed. If an aggregate or color unevenness between the resin and pulp was not provided on the surface of the sheet, the sheet was evaluated as "A". If color unevenness was provided, the sheet was evaluated as "B".

Example 1

A pulp-dispersed polypropylene pellet was manufactured by the following manufacturing method.

Polypropylene (manufactured by Prime polymer Co., Ltd., product name of J108M, and thermal conductivity of 0.15 W/(m·K)) as an example of the base compound resin according to the disclosure, cotton-like conifer tree pulp (manufactured by Mitsubishi Paper Mills Ltd., product name of NBKP Celgar, average fiber diameter of 1 µm, and thermal conductivity of 0.6 W/(m·K)) as an example of the organic fibrous filler according to the disclosure, and maleic anhydride-modified polyolefin (manufactured by SANYO CHEMICAL INDUSTRIES, product name of YOUMEX (registered trademark)) as an example of the dispersing agent according to the disclosure were weighed so as to have 100:15:5 by mass ratio, thereby a dry blend was obtained. Then, molten-kneading dispersing was performed by a two-axial kneader (KRC kneader, manufactured by Kurimoto Ltd.), and thus a pulp-dispersed polypropylene pellet was manufactured.

The manufactured pulp-dispersed polypropylene pellet was disposed on a SUS plate and the pellet was surrounded by sim plates having a thickness of 2 mm, so as to have a rectangular shape. One piece of SUS plate was disposed thereon, and was pinched to a flat heat press machine having a temperature of 200° C. (11FD manufactured Imoto Machinery Co., Ltd.). Then, a load of 3 t was applied, and thus a sheet-like molten liquid was obtained.

The molten sheet resin was left on an iron plate in a state of being interposed between the SUS plates, and was cooled at room temperature. After the resin was cooled to room temperature, the resin sheet was extracted, thereby a resin sheet having a thickness of 2 mm was obtained.

The obtained resin sheet was subjected to sequential biaxial stretch at 150° C. in a biaxial stretching machine (11A9 manufactured by Imoto Machinery Co., Ltd.). The stretch ratio was set as three times thereof. With the above method, a pulp fiber-dispersed polypropylene sheet was obtained as a composite resin molded body.

The obtained pulp-dispersed polypropylene sheet had elastic modulus of 2.6 GPa, and had improved strength in comparison to a general polypropylene sheet in which pulp was not dispersed. The color difference ($\Delta L$) of the obtained sheet was 5 and it was evaluated that the occurrence of color deepening was suppressed well.

Regarding pulp dispersed in the sheet, the fiber diameter of $D_{10}$ was 3 nm, and the fiber diameter of $D_{90}$ was 14 µm. The proportion T of pulp which had been carbonized and dispersed in the sheet was 0.06.

In the obtained sheet, an aggregate was not viewed on the surface, and color unevenness between the resin and the pulp was not provided.

Examples 2 to 4 and Comparative Examples 1 to 3

In Examples 2 to 4 and Comparative Examples 1 to 3, a pulp fiber-dispersed polypropylene sheet was manufactured in a manner similar to that in Example 1 except that the content of the pulp and the type of the dispersing agent were changed to the content and type described in Table 1. In Example 4, an unsaturated hydrocarbon silane coupling agent (manufactured by Momentive Corporation, product name of SILQUEST) was used as the dispersing agent.

Comparative Example 4

A pulp fiber-dispersed polypropylene sheet was manufactured in a manner similar to that in Example 1 except for using pulp fiber in which defibration of fiber proceeded by pretreatment (defibration and modification of fiber by applying a physical shearing force in a pulverizing machine and the like, or by wet dispersing using water and a dispersing agent).

Comparative Example 5

A sheet-like molten liquid in which pulp was impregnated was obtained in a manner similar to that in Example 1 except that a pulp-dispersed polypropylene pellet was not manufactured, and a polypropylene pellet and pulp were disposed on a SUS plate. Then, a fiber-dispersed polypropylene sheet was produced by a method similar to that in Example 1.

Table 1 shows a configuration, a manufacturing condition, a measurement result, and an evaluation result of the composite resin molded body of each of Examples 1 to 4 and Comparative Examples 1 to 5.

was not contained, color deepening of the resin sheet by carbonizing fiber was not recognized. However, since the amount of pulp functioning as a physical skeleton in the base compound resin was small or the pulp was not provided, it was not possible that mechanical strength was sufficiently increased, and as a result, a problem of insufficient elastic modulus occurred.

In Comparative Example 2 in which the content of pulp was 80 mass %, color deepening of the resin sheet was recognized, and appearance poorness in which an aggregate of pulp was provided on the surface of the resin sheet occurred. This is considered as follows. The added amount

TABLE 1

| | Organic fibrous filler | | Dispersing agent | | Manufacturing condition | | Fiber | | | Elastic modulus GPa | Mechanical strength | Proportion of carbonized organic fibrous filler (T) | Color difference ΔL | Suppression of color deepening | Appearance |
|---|---|---|---|---|---|---|---|---|---|---|---|---|---|---|---|
| | | | | | Kneading temperature | Kneading | diameter (in resin) | | | | | | | | |
| Unit | Shape — | Content mass % | Type — | Content mass % | ° C. | type | D10 nm | D90 μm | | | | | | | |
| Example 1 | Pulp | 15 | Maleic anhydride-modified polyolefin | 5 | 170 | Kneading | 3 | 14 | 2.6 | A | 0.06 | 5 | A | A |
| Example 2 | Pulp | 5 | Maleic anhydride-modified polyolefin | 5 | 170 | Kneading | 3 | 8 | 2.2 | A | 0.04 | 2 | A | A |
| Example 3 | Pulp | 70 | Maleic anhydride-modified polyolefin | 5 | 170 | Kneading | 5 | 16 | 5 | A | 0.1 | 10 | A | A |
| Example 4 | Pulp | 15 | Unsaturated hydrocarbon silane coupling agent | 5 | 170 | Kneading | 3 | 15 | 2.3 | A | 0.07 | 4 | A | A |
| Comparative Example 1 | Pulp | 3 | Maleic anhydride-modified polyolefin | 5 | 170 | Kneading | 3 | 5 | 2 | B | 0.03 | 3 | A | A |
| Comparative Example 2 | Pulp | 80 | Maleic anhydride-modified polyolefin | 5 | 170 | Kneading | 2 | 30 | 5.5 | A | 0.22 | 20 | B | B |
| Comparative Example 3 | Pulp | 0 | Maleic anhydride-modified polyolefin | 5 | 170 | Kneading | 3 | 14 | 1.9 | B | — | — | A | A |
| Comparative Example 4 | Defibrated pulp | 15 | Maleic anhydride-modified polyolefin | 5 | 170 | Kneading | 2 | 3 | 2.6 | A | 0.2 | 23 | B | A |
| Comparative Example 5 | Pulp | 15 | Maleic anhydride-modified polyolefin | 5 | 170 | Impregnation | 25 | 5 | 1.9 | B | 0.06 | 4 | A | A |

As apparent from Table 1, in the composite resin molded bodies in Examples 1 to 3 in which the content of pulp was at least 5 mass % and at most 70 mass %, and the dispersing agent was maleic anhydride-modified polyolefin, and the composite resin molded body in Example 4 in which the dispersing agent was a silane coupling agent, the elastic modulus was high, color deepening occurred less frequently, an aggregate or color unevenness between a resin and pulp was not provided on the surface, the visual aspect was uniform, and the appearance was good.

In Comparative Example 1 in which the content of pulp was 3 mass %, and Comparative Example 3 in which pulp of pulp was increased, and thus resin viscosity at a time of molten-kneading was increased, and temperature increase by shearing force was easily caused. Thus, carbonization of pulp fiber proceeded, and the resin content with respect to the pulp content was not sufficient. Accordingly, a portion of pulp fiber was not defibrated, and an aggregate was mixed into the resin sheet.

In Comparative Example 4 using defibrated pulp which had been subjected to pretreatment by wet dispersing, color deepening of the resin sheet was recognized. This is considered as follows. Pretreatment of pulp caused a fiber diameter of pulp to become smaller or caused physical damage to be applied to fiber, and thus thermal conductivity was degraded. Accordingly, it was not possible that heat generated at a time of molten-kneading was sufficiently dispersed, and pulp fiber was easily carbonized. The fiber diameter of $D_{90}$ of pulp dispersed in the resin was 3 µm, and this was smaller than those in Examples.

In Comparative Example 5 in which pulp was mixed with the resin by an impregnation method, the fiber diameter of $D_{10}$ of pulp was 25 nm, and was a larger value than those in Examples. It is considered that this is because a shearing force by molten-kneading was not applied to pulp fiber, and thus the amount of pulp fiber having a small fiber diameter was small. Accordingly, in Comparative Example 5 in which pulp functioning as a physical skeleton in the base compound resin was small, and thus it was not possible that mechanical strength was sufficiently increased, and as a result, a problem of insufficient elastic modulus occurred. Accordingly, the fiber diameter of $D_{10}$ of pulp is more preferably equal to or less than 20 nm, as shown in Table 1.

From the above evaluations, the followings were understood. The base compound resin, the pulp fiber in which the content was at least 5 mass % and at most 70 mass %, and the dispersing agent were molten-kneaded, and thus it was possible to manufacture a composite resin molded body in which the occurrence of color deepening was suppressed, and mechanical strength and appearance were excellent.

In the composite resin molded body according to the disclosure, mechanical strength of a resin molded body can be reinforced, and simultaneously, the occurrence of color deepening of a resin can be suppressed. Thus, the composite resin molded body is useful as a composite resin molded body used in a casing component of home appliances or used for being in-vehicle or for aviation.

What is claimed is:

1. A composite resin molded body comprising:
    a base compound resin; and
    a molten-kneaded mixture which contains an organic fibrous filler and a dispersing agent,
    wherein the organic fibrous filler is a compound in which cellulose is contained, and has a content of at least 5 mass % and at most 70 mass % in the composite resin molded body,
    a proportion T of the organic fibrous filler carbonized in the composite resin molded body is represented by Formula (1), $$T=P_C/(P_C+P_{UC}) \qquad (1),$$

when $P_C$ is set as a height of a peak derived from a carbonyl group in an IR spectrum obtained by analyzing any place of the composite resin molded body with a FT-IR method, and $P_{UC}$ is set as a height of a peak derived from an ether group in the same IR spectrum, and
    the proportion T is equal to or less than 0.1,
    wherein a fiber diameter of $D_{90}$ is equal to or more than 5 µm and a fiber diameter of $D_{10}$ is equal to or less than 500 nm in fiber diameter distribution of the organic fibrous filler.

2. The composite resin molded body of claim 1, wherein an absolute value ($|(L^*)1-(L^*)2|$) of a difference between brightness ($(L^*)1$) of the base compound resin and brightness ($(L^*)2$) of the composite resin molded body is equal to or less than 10.

3. The composite resin molded body of claim 1, wherein the base compound resin is a thermoplastic resin.

4. The composite resin molded body of claim 3, wherein the thermoplastic resin is an olefinic resin.

5. The composite resin molded body of claim 4, wherein the olefinic resin is polypropylene.

6. A manufacturing method of the composite resin molded body of claim 1, the method comprising:
    performing molding after the base compound resin, the organic fibrous filler, and the dispersing agent are molten and kneaded.

7. A casing member comprising:
    the composite resin molded body of claim 1.

* * * * *